United States Patent
Ogata et al.

(10) Patent No.: US 10,408,232 B2
(45) Date of Patent: Sep. 10, 2019

(54) TURBO MACHINE

(71) Applicant: Panasonic Intellectual Property Management Co., Ltd., Osaka (JP)

(72) Inventors: Takeshi Ogata, Osaka (JP); Tadayoshi Shoyama, Osaka (JP); Akira Hiwata, Shiga (JP); Hidetoshi Taguchi, Osaka (JP); Kazuyuki Kouda, Osaka (JP); Hiroshi Hasegawa, Saitama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 530 days.

(21) Appl. No.: 15/188,031

(22) Filed: Jun. 21, 2016

(65) Prior Publication Data

US 2017/0023021 A1    Jan. 26, 2017

(30) Foreign Application Priority Data

Jul. 22, 2015  (JP) ................... 2015-144913

(51) Int. Cl.
    *F01D 25/16*    (2006.01)
    *F04D 29/047*    (2006.01)
    (Continued)

(52) U.S. Cl.
    CPC .......... *F04D 29/668* (2013.01); *F01D 9/026* (2013.01); *F01D 9/065* (2013.01); *F01D 25/162* (2013.01);
    (Continued)

(58) Field of Classification Search
    CPC ...... F01D 25/162; F01D 25/18; F01D 25/164; F01D 9/065; F04D 17/122; F04D 29/046;
    (Continued)

(56) References Cited

U.S. PATENT DOCUMENTS 3,795,427 A * 3/1974 Licht ............... F16C 17/024
                                                  384/103
3,964,805 A * 6/1976 Schulien ........... F16C 17/105
                                                  384/399
(Continued)

FOREIGN PATENT DOCUMENTS

JP    58-196319    11/1983
JP    2007-224868    9/2007

*Primary Examiner* — Justin D Seabe
*Assistant Examiner* — Jose M Siguenza, Jr.
(74) *Attorney, Agent, or Firm* — McDermott Will & Emery LLP

(57) ABSTRACT

A turbo machine according to present disclosure includes a rotating shaft, a first impeller, a first fluid bearing, a first holding member, a first lubricating liquid casing, a first supplying passage, and a first squeeze film damper. The first fluid bearing rotatably supports the first taper portion and the first cylindrical portion. The first fluid bearing is attached to the first holding member. The first lubricating liquid casing forms a first storing space. The first supplying passage is a passage through which a lubricating liquid is supplied to the first storing space. The first squeeze film damper is a space located between the first fluid bearing and the first holding member. The first squeeze film damper communicates with the first supplying passage.

6 Claims, 8 Drawing Sheets

(51) Int. Cl.
*F04D 29/06* (2006.01)
*F04D 17/12* (2006.01)
*F04D 29/053* (2006.01)
*F01D 25/18* (2006.01)
*F02C 6/12* (2006.01)
*F04D 29/66* (2006.01)
*F04D 29/057* (2006.01)
*F04D 29/063* (2006.01)
*F16C 27/04* (2006.01)
*F04D 29/28* (2006.01)
*F01D 9/02* (2006.01)
*F01D 9/06* (2006.01)

(52) U.S. Cl.
CPC .......... *F01D 25/164* (2013.01); *F01D 25/18* (2013.01); *F02C 6/12* (2013.01); *F04D 17/122* (2013.01); *F04D 29/047* (2013.01); *F04D 29/053* (2013.01); *F04D 29/057* (2013.01); *F04D 29/061* (2013.01); *F04D 29/063* (2013.01); *F04D 29/286* (2013.01); *F16C 27/045* (2013.01); *F05D 2220/40* (2013.01); *F05D 2260/98* (2013.01)

(58) Field of Classification Search
CPC .... F04D 29/047; F04D 29/057; F04D 29/056; F04D 29/0473; F04D 29/0413; F04D 29/0513; F04D 29/668; F04D 29/063; F04D 29/061; F05B 2260/98; F05B 2240/53; F05B 2240/52; F05D 2240/50; F05D 2240/53; F05D 2240/52; F16C 17/10; F16C 17/105; F16C 27/045; F16C 32/0607; F16C 33/1055; F25B 1/053
See application file for complete search history.

(56) References Cited

U.S. PATENT DOCUMENTS

| | | | | |
|---|---|---|---|---|
| 5,344,239 A * | 9/1994 | Stallone | ............... | F01D 25/164 384/99 |
| 8,302,754 B2 * | 11/2012 | Yagi | ............... | F16D 1/092 192/101 |
| 8,915,666 B2 * | 12/2014 | Yanagisawa | .......... | B63H 23/34 403/1 |
| 2007/0201999 A1 | 8/2007 | Shibata et al. | | |
| 2011/0174009 A1 * | 7/2011 | Iizuka | ............... | F04D 25/06 62/305 |
| 2014/0341710 A1 * | 11/2014 | Creamer | ............... | F04D 29/063 415/111 |

* cited by examiner

TURBO MACHINE

BACKGROUND

1. Technical Field

The present disclosure relates to a turbo machine.

2. Description of the Related Art

Existing turbo machines include a thrust bearing and a radial bearing, which are independent from each other. The thrust bearing supports an axial load (thrust load) generated due to a differential pressure between both surfaces of an impeller. The radial bearing supports a radial load. Some turbo machines include an angular ball bearing for supporting the thrust load and the radial load. Tapered roller bearings are known as bearings for supporting a rotating shaft. Moreover, turbo machines including an air bearing or a water bearing are known.

FIG. 7 illustrates an air bearing device 500 described in Japanese Unexamined Patent Application Publication No. 58-196319, which includes a rotating shaft 501, a bearing member 503, a bearing member 504, an air bearing 506, an air bearing 507, a flow passage 508, and a flow passage 509. The air bearing 506 is disposed between the rotating shaft 501 and the bearing member 503. The air bearing 507 is disposed between the rotating shaft 501 and the bearing member 504. The flow passage 508 is formed in the bearing member 503, and the flow passage 509 is formed in the bearing member 504. Pressurized air is supplied to the air bearing 506 through the flow passage 508. Pressurized air is supplied to the air bearing 507 through the flow passage 509. The air bearing 506 and the air bearing 507 are tapered, and the large-diameter side of the air bearing 506 and the large-diameter side of the air bearing 507 face each other.

A pressure sensor 515 is disposed on the bearing surface of the bearing member 503. The pressure sensor 515 detects the pressure P in the air bearing 506, and an output signal p from the pressure sensor 515 is transmitted to a computing unit 516. The computing unit 516 converts the pressure P into a bearing clearance C and uses the bearing clearance C or the pressure P as a control signal. The value of the bearing clearance C is changed by moving the bearing member 503 rightward or leftward in FIG. 7 using a feed motor 514 so that the output signal p has a predetermined value. Thus, the bearing clearance C is maintained at the optimum value.

FIG. 8 illustrates a heat pump system 600 described in Japanese Unexamined Patent Application Publication No. 2007-224868, which uses water as a working fluid and which includes a water bearing. The heat pump system 600 includes a compressor 634 including a first compressing unit 633 and a second compressing unit 632. In the compressor 634, an impeller is connected to a rotor shaft. The rotor shaft of the compressor 634 is supported by a bearing 651. The bearing 651 is a water bearing. Lubricating water, which is supplied from a water supply system 653 to the bearing 651, absorbs frictional heat while functioning as a lubricant near the bearing 651. In the heat pump system 600, the temperature of lubricating water supplied to the bearing 651 is set to be equal to or lower than a temperature that is the difference between a lubricant-water set temperature (the saturation temperature −15° C.) and an increase in temperature when lubricating the bearing. Thus, reduction in the reliability of the bearing 651 is suppressed.

SUMMARY

The air bearing device described in Japanese Unexamined Patent Application Publication No. 58-196319 has room for improvement so that a rotating shaft can be stably supported by using a simple structure. The technology described in Japanese Unexamined Patent Application Publication No. 2007-224868, in which a water bearing is used, has room for improvement in the reliability against vibration.

One non-limiting and exemplary embodiment provides a turbo machine in which a rotating shaft can be stably supported by using a simple structure and that has high reliability against vibration.

In one general aspect, the techniques disclosed here feature a turbo machine including a rotating shaft that includes a first taper portion and a first cylindrical portion, the first taper portion decreasing in diameter toward a first end of the rotating shaft in an axial direction of the rotating shaft, the first cylindrical portion being located on a side of the first taper portion opposite from the first end, the first cylindrical portion being constant in diameter; a first impeller that is located on the side of the first taper portion opposite from the first end in the axial direction of the rotating shaft, that is fixed to the rotating shaft, and that compresses or expands a working fluid; a first fluid bearing that rotatably supports the first taper portion both in a radial direction and the axial direction of the rotating shaft via a lubricating liquid and that rotatably supports the first cylindrical portion in the radial direction of the rotating shaft via the lubricating liquid; a first holding member that is disposed outside the first fluid bearing in a radial direction of the first fluid bearing, the first fluid bearing being attached to the first holding member; a first lubricating liquid casing that is disposed adjacent to the first holding member and that forms a first storing space, the first storing space being capable of storing the lubricating liquid, which is to be supplied to the first fluid bearing; a first supplying passage through which the lubricating liquid is supplied to the first storing space; and a first squeeze film damper that is a space located between the first fluid bearing and the first holding member in the radial direction of the first fluid bearing, the first squeeze film damper communicating with the first supplying passage.

In the turbo machine, a rotating shaft can be stably supported by using a simple structure, and the turbo machine has high reliability against vibration.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
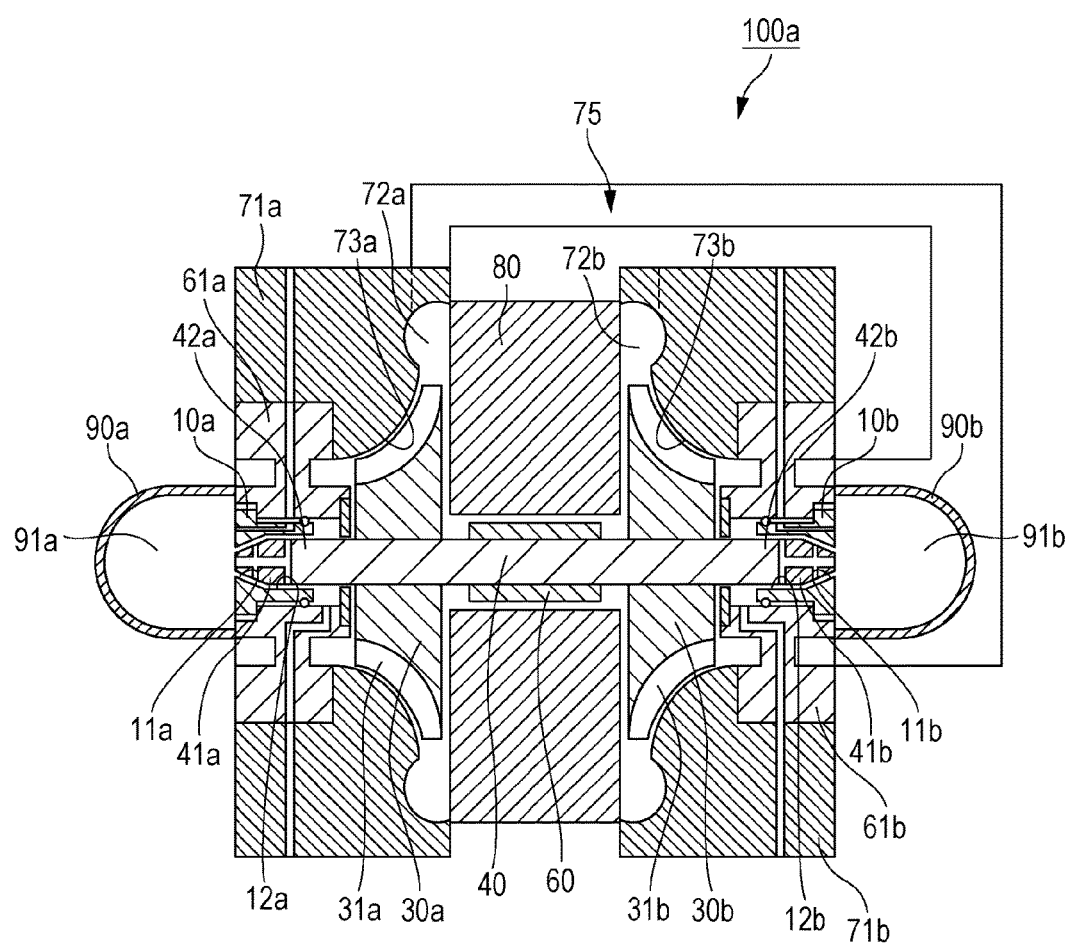
FIG. 1 is a sectional view of a turbo machine according to a first embodiment.

When a rotating shaft of a turbo machine is supported by a fluid bearing, a temperature difference occurs between the rotating shaft and a bearing member of the fluid bearing for such reasons as generation of frictional heat due to the rotation of the rotating shaft and a change in ambient temperature. Due to the temperature difference, a difference in thermal expansion may occur between these components, and a clearance between the rotating shaft and the bearing member of the fluid bearing may fluctuate. Moreover, because the sizes of these components generally vary widely in the longitudinal direction of the rotating shaft, the initial clearance when these components are assembled has a large variation in the longitudinal direction of the rotating shaft. If the clearance between the rotating shaft and the bearing member of the fluid bearing becomes too large, a fluid pressure necessary for supporting the rotating shaft may not be supplied, and movement of the rotating shaft may become unstable. If the clearance between the rotating shaft and the bearing member of the fluid bearing becomes too small, contact between the rotating shaft and the bearing member may occur, and the performance and the reliability of the turbo machine having the rotating shaft may considerably decrease.

The air bearing device 500 described in Japanese Unexamined Patent Application Publication No. 58-196319 can maintain the bearing clearance C at the optimum value. However, because the feed motor 514, the pressure sensor 515, and the computing unit 516 are necessary, the structure of the device is complex and the production cost of the device is high.

With the technology described in Japanese Unexamined Patent Application Publication No. 2007-224868, boiling of the lubricating water in the bearing 651 is prevented by setting the temperature of lubricating water, which is supplied to the bearing 651, at a predetermined temperature or lower. However, Japanese Unexamined Patent Application Publication No. 2007-224868 does not describe a tapered bearing and does not show specific means for suppressing vibration that occurs due to the rotation of a rotating shaft of a turbo machine. Therefore, the technology described Japanese Unexamined Patent Application Publication No. 2007-224868 has room for improvement in the reliability against vibration.

A first aspect of the present disclosure provides a turbo machine including:

a rotating shaft that includes a first taper portion and a first cylindrical portion, the first taper portion decreasing in diameter toward a first end of the rotating shaft in an axial direction of the rotating shaft, the first cylindrical portion being located on a side of the first taper portion opposite from the first end, the first cylindrical portion being constant in diameter;

a first impeller that is located on the side of the first taper portion opposite from the first end in the axial direction of the rotating shaft, that is fixed to the rotating shaft, and that compresses or expands a working fluid;

a first fluid bearing that rotatably supports the first taper portion both in a radial direction and the axial direction of the rotating shaft via a lubricating liquid and that rotatably supports the first cylindrical portion in the radial direction of the rotating shaft via the lubricating liquid;

a first holding member that is disposed outside the first fluid bearing in a radial direction of the first fluid bearing, the first fluid bearing being attached to the first holding member;

a first lubricating liquid casing that is disposed adjacent to the first holding member and that forms a first storing space, the first storing space being capable of storing the lubricating liquid, which is to be supplied to the first fluid bearing;

a first supplying passage through which the lubricating liquid is supplied to the first storing space; and a first squeeze film damper that is a space located between the first fluid bearing and the first holding member in the radial direction of the first fluid bearing, the first squeeze film damper communicating with the first supplying passage.

With the first aspect, the first fluid bearing supports not only the first taper portion but also the first cylindrical portion of the rotating shaft. That is, the first cylindrical portion is supported in the radial direction. Therefore, the rotating shaft is stably supported even when a thermal expansion difference in the axial direction of the rotating shaft occurs between the rotating shaft and the first fluid bearing due to the temperature difference between the rotating shaft and the first fluid bearing. Moreover, with the first aspect, the turbo machine has a simple structure, because a pressure sensor, a computing unit, and a motor for moving a bearing member are not necessary. Furthermore, because the first squeeze film damper produces a squeeze effect due to the viscosity of a liquid film of the lubricating liquid, vibration of the first fluid bearing is reduced, and therefore the turbo machine has high reliability.

A second aspect of the present disclosure provides the turbo machine according to the first aspect, further including a first inlet passage through which the first squeeze film damper communicates with the first storing space and through which the lubricating liquid flows from the first squeeze film damper to the first storing space. With the second aspect, the lubricating liquid, which forms the liquid film of the first squeeze film damper, flows to the first storing space through the first inlet passage. Thus, the lubricating liquid is prevented from becoming stagnant in the first squeeze film damper, and an increase in the temperature of the lubricating liquid in the first squeeze film damper is suppressed. As a result, foaming of the lubricating liquid in the first squeeze film damper is prevented. In particular, in a case where the turbo machine is operated for a long time and the temperature of a region around the first fluid bearing increases, the vibration reduction effect of the first squeeze film damper is advantageously produced, and the turbo machine has high reliability.

A third aspect of the present disclosure provides the turbo machine according to the first or second aspect, further including:

a first partitioning member that is disposed on a side of the first holding member opposite from the first lubricating liquid casing, the first partitioning member forming a first discharge space that stores the lubricating liquid, which has flowed out of the first fluid bearing;

a first discharge passage through which the lubricating liquid stored in the first discharge space is discharged to the outside of the first discharge space; and a first sealing member that is disposed between the first fluid bearing and the first holding member in the radial direction of the first fluid bearing and that separates the first squeeze film damper and the first discharge space from each other.

With the third aspect, the lubricating liquid that has flowed out of the first fluid bearing is stored in the first discharge space, and then is discharged to the outside of the first discharge space through the first discharge passage. In addition, because the first sealing member separates the first squeeze film damper and the first discharge space from each other, the pressure of the lubricating liquid in the first squeeze film damper is not likely to be affected by the pressure of the lubricating liquid in the first discharge space. Therefore, even if the pressure of the lubricating liquid in the first discharge space is comparatively low, it is easy to make the pressure of the lubricating liquid in the first squeeze film damper sufficiently high. As a result, it is possible to prevent foaming of the lubricating liquid in the first squeeze film damper, which may occur if the lubricating liquid in the first squeeze film damper decreases due to the influence of the pressure of the lubricating liquid in the first discharge space. Thus, the turbo machine has high reliability.

A fourth aspect of the present disclosure provides the turbo machine according to any one of the first to third aspects, wherein the rotating shaft further includes a second taper portion and a second cylindrical portion, the second taper portion decreasing in diameter toward a second end of the rotating shaft in the axial direction of the rotating shaft, the second cylindrical portion being located on a side of the second taper portion opposite from the second end, the second cylindrical portion being constant in diameter, the turbo machine further including:

a second impeller that is located on a side of the first impeller opposite from the first fluid bearing in the axial direction of the rotating shaft, that is fixed to the rotating shaft, and that further compresses or expands the working fluid that has been compressed or expanded by the first impeller;

a second fluid bearing that is disposed on a side of the second impeller opposite from the first impeller in the axial direction of the rotating shaft, that rotatably supports the second taper portion both in the radial direction and the axial direction of the rotating shaft via a lubricating liquid, and that rotatably supports the second cylindrical portion in the radial direction of the rotating shaft via the lubricating liquid;

a second holding member that is disposed outside the second fluid bearing in a radial direction of the second fluid bearing, the second fluid bearing being attached to the second holding member;

a second lubricating liquid casing that is disposed adjacent to the second holding member and that forms a second storing space, the second storing space being capable of storing the lubricating liquid, which is to be supplied to the second fluid bearing;

a second supplying passage through which the lubricating liquid is supplied to the second storing space; and a second squeeze film damper that is a space located between the second fluid bearing and the second holding member in the radial direction of the second fluid bearing, the second squeeze film damper communicating with the second supplying passage.

With the fourth aspect, the second fluid bearing supports not only the second taper portion but also the second cylindrical portion of the rotating shaft. That is, the second cylindrical portion is supported in the radial direction. Therefore, the rotating shaft is stably supported even when a thermal expansion difference in the axial direction of the rotating shaft occurs between the rotating shaft and the second fluid bearing due to the temperature difference between the rotating shaft and the second fluid bearing. Moreover, with the fourth aspect, the turbo machine has a simple structure, because a pressure sensor, a computing unit, and a motor for moving a bearing member are not necessary. Furthermore, because the second squeeze film damper produces a squeeze effect due to the viscosity of a liquid film of the lubricating liquid, vibration of the second fluid bearing is reduced, and therefore the turbo machine has high reliability.

A fifth aspect of the present disclosure provides the turbo machine according to any one of the first to fourth aspects, wherein the working fluid is a fluid whose saturated vapor pressure at a normal temperature is a negative pressure, and a part of the working fluid that is in a liquid state outside of the turbo machine is supplied, as the lubricating liquid, to the first fluid bearing through the first supplying passage. With the fifth aspect, a part of the working fluid that is in a liquid state outside the turbo machine can be supplied, as a lubricating liquid, to the first bearing. Thus, contamination of the working fluid with the lubricating liquid can be prevented. Moreover, because the first squeeze film damper communicates with the first supplying passage, at least a part of the lubricating liquid that flows through the first supplying passage is also supplied to the first squeeze film damper. Therefore, a part of the working fluid that is in a liquid state outside the turbo machine can be supplied to the first squeeze film damper. As a result, the running cost of the turbo machine can be reduced, compared with a case where a liquid of a type different from the working fluid is supplied to the first fluid bearing or the first squeeze film damper.

A sixth aspect of the present disclosure provides the turbo machine according to the fourth aspect, wherein the working fluid is a fluid whose saturated vapor pressure at a normal temperature is a negative pressure, a part of the working fluid that is in a liquid state outside of the turbo machine is supplied, as the lubricating liquid, to the first fluid bearing through the first supplying passage and is supplied, as the lubricating liquid, to the second fluid bearing through the second supplying passage. With the sixth aspect, a part of the working fluid that is in a liquid state outside the turbo machine can be supplied, as a lubricating liquid, to the first bearing and the second fluid bearing. Because the first squeeze film damper communicates with the first supplying passage, at least a part of the lubricating liquid that flows through the first supplying passage is also supplied to the first squeeze film damper. Moreover, because the second squeeze film damper communicates with the second supplying passage, at least a part of the lubricating liquid that flows through the second supplying passage is also supplied to the second squeeze film damper. Therefore, a part of the working fluid that is in a liquid state outside the turbo machine can be supplied to the first squeeze film damper and the second squeeze film damper. As a result, the running cost of the turbo machine can be reduced, compared with a case where a liquid of a type different from the working fluid is supplied to the first fluid bearing, the second fluid bearing, the first squeeze film damper, and the second squeeze film damper.

Hereinafter, embodiments of the present disclosure will be described with reference to the drawings. The following descriptions relate to an example of the present disclosure, and the present disclosure is not limited to the descriptions.

First Embodiment

Figure 2:
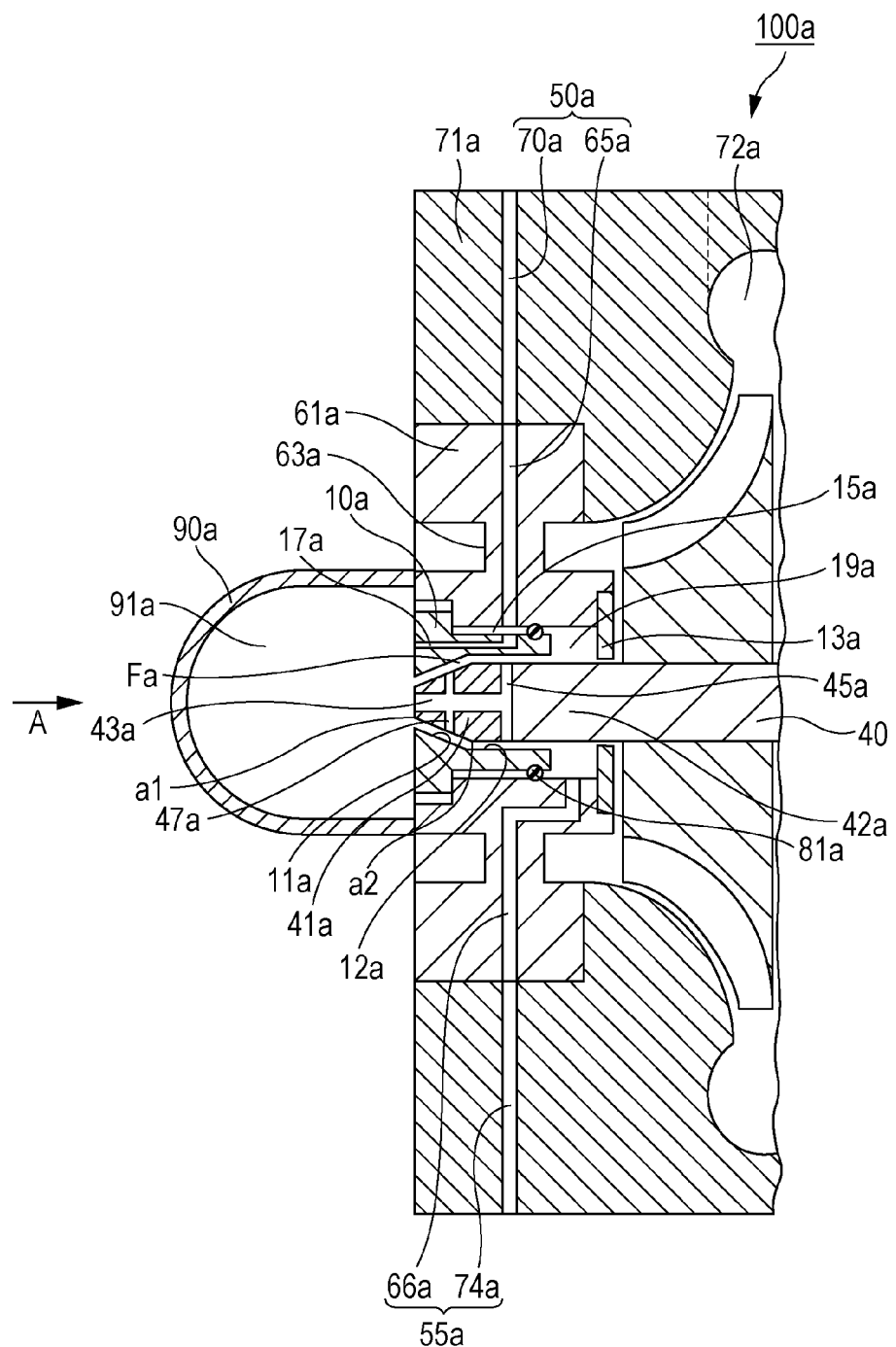
FIG. 2 is an enlarged sectional view illustrating a part of the turbo machine illustrated in FIG. 1.

As illustrated in FIGS. 1 and 2, a turbo machine 100a includes a rotating shaft 40, a first impeller 30a, a first fluid bearing 10a, a first holding member 61a, a first lubricating liquid casing 90a, a first supplying passage 50a, and a first squeeze film damper 15a. The rotating shaft 40 includes a first taper portion 41a and a first cylindrical portion 42a. The first taper portion 41a decreases in diameter toward a first end of the rotating shaft 40 in the axial direction of the rotating shaft 40. The first taper portion 41a includes a small diameter end a1 and a large diameter end a2. The first cylindrical portion 42a is located on a side of the first taper portion 41a opposite from the first end of the rotating shaft 40 and is constant in diameter. In other words, the first cylindrical portion 42a is adjacent to the large diameter end a2 of the first taper portion 41a. The first impeller 30a is located on a side of the first taper portion 41a opposite from the first end of the rotating shaft 40 and is fixed to the rotating shaft 40. The first impeller 30a compresses or expands a working fluid. The first fluid bearing 10a rotatably supports the first taper portion 41a both in the radial direction of the rotating shaft 40 and in the axial direction of the rotating shaft 40 via a lubricating liquid. Moreover, the first fluid bearing 10a rotatably supports the first cylindrical portion 42a in the radial direction of the rotating shaft 40. The first holding member 61a is disposed outside the first fluid bearing 10a in the radial direction of the first fluid bearing 10a. The first fluid bearing 10a is attached to the first holding member 61a. The first lubricating liquid casing 90a is disposed adjacent to the first holding member 61a and forms a first storing space 91a that is capable of storing the lubricating liquid, which is to be supplied to the first fluid bearing 10a. The first supplying passage 50a is a passage through which the lubricating liquid is supplied to the first storing space 91a. The first squeeze film damper 15a is a space located between the first fluid bearing 10a and the first holding member 61a in the radial direction of the first fluid bearing 10a. The first squeeze film damper 15a communicates with the first supplying passage 50a.

As illustrated in FIG. 1, the first impeller 30a includes a front portion 31a facing forward from the first impeller 30a. For example, the first taper portion 41a decreases in diameter toward the first end of the rotating shaft 40, which is in front of the first impeller 30a. In other words, the first taper portion 41a increases in diameter toward the first impeller 30a. The rotating shaft 40 includes the first cylindrical portion 42a, which is located closer than the first taper portion 41a to the first impeller 30a. For example, in the rotating shaft 40, the outer surface of the first taper portion 41a and the outer surface of the first cylindrical portion 42a are continuously formed. The first impeller 30a is fixed, for example, to the first cylindrical portion 42a.

The first fluid bearing 10a is a friction bearing. That is, a lubricating liquid is present between the first fluid bearing 10a and the first taper portion 41a and between the first fluid bearing 10a and the first cylindrical portion 42a. The first fluid bearing 10a is disposed, for example, in front of the first impeller 30a. The first fluid bearing 10a has a bearing hole that is formed by a taper bearing surface 11a for supporting the first taper portion 41a and a bearing hole that is formed by a straight bearing surface 12a for supporting the first cylindrical portion 42a. The taper bearing surface 11a is a truncated conical surface that is inclined with respect to the axis of the bearing hole formed by the taper bearing surface 11a. The taper bearing surface 11a forms a tapered hole that is slightly greater in diameter than the first taper portion 41a. The diameter of the tapered hole formed by the taper bearing surface 11a increases toward the first impeller 30a. Thus, a thrust load that is generated when the first impeller 30a rotates at a high speed is supported. The straight bearing surface 12a is a cylindrical surface that extends parallel to the axis of the bearing hole formed by the straight bearing surface 12a. In this way, the first fluid bearing 10a rotatably supports the first taper portion 41a and the first cylindrical portion 42a. For example, the first fluid bearing 10a supports a portion of the rotating shaft 40 near the first end of the rotating shaft 40 in front of the first impeller 30a.

For example, the first fluid bearing 10a has a flange, and the first holding member 61a has a radial surface that is in contact with the flange of the first fluid bearing 10a. The flange of the first fluid bearing 10a has through-holes (not shown) into which bolt are inserted. The radial surface of the first holding member 61a has grooves (not shown), into which ends of the bolts are inserted, at positions corresponding to the through-holes formed in the flange of the first fluid bearing 10a. The first fluid bearing 10a is attached to the first holding member 61a by inserting the bolts into the through-holes formed in the flange of the first fluid bearing 10a and into the grooves formed in the radial surface of the first holding member 61a.

Figure 3:
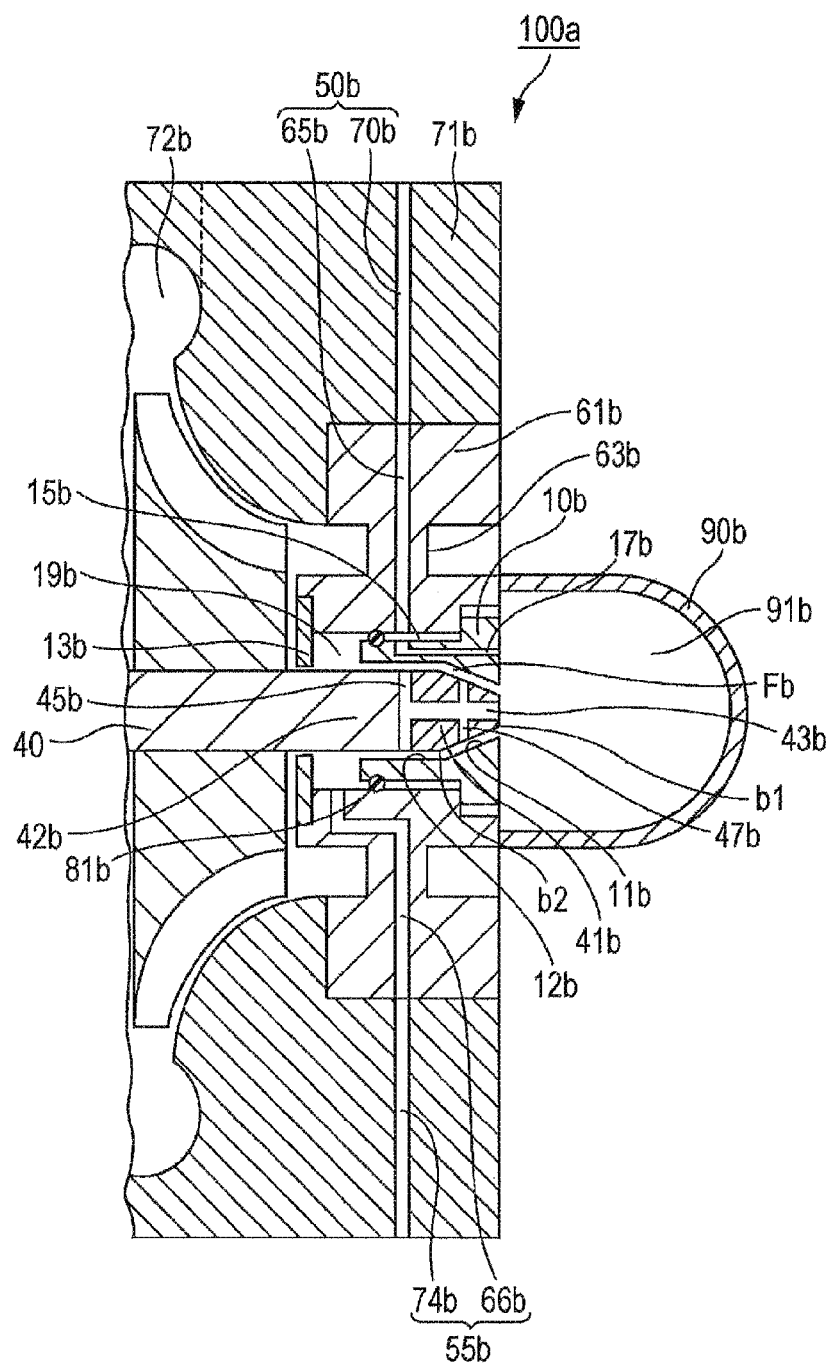
FIG. 3 is an enlarged sectional view illustrating another part of the turbo machine illustrated in FIG. 1.

As illustrated in FIGS. 1 and 3, for example, the rotating shaft 40 further includes a second taper portion 41b and a second cylindrical portion 42b. The second taper portion 41b decreases in diameter toward a second end of the rotating shaft 40 in the axial direction of the rotating shaft 40. The second taper portion 41b includes a small diameter end b1 and a large diameter end b2. The second cylindrical portion 42b is located on a side of the second taper portion 41b opposite from the second end of the rotating shaft 40 and is constant in diameter. In other words, the second cylindrical portion 42b is adjacent to the large diameter end b2 of the second taper portion 41b. The turbo machine 100a further includes a second impeller 30b, a second fluid bearing 10b, a second holding member 61b, a second lubricating liquid casing 90b, a second supplying passage 50b, and a second squeeze film damper 15b. The second impeller 30b is located on a side of the first impeller 30a opposite from the first fluid bearing 10a in the axial direction of the rotating shaft 40 and is fixed to the rotating shaft. The second impeller 30b further compresses or expands the working fluid, which has been compressed or expanded by the first impeller 30a. The second fluid bearing 10b is disposed on a side of the second impeller 30b opposite from the first impeller 30a in the axial direction of the rotating shaft 40. The second fluid bearing 10b rotatably supports the second taper portion 41b both in the radial direction of the rotating shaft 40 and in the axial direction of the rotating shaft 40 via a lubricating liquid. Moreover, the second fluid bearing 10b rotatably supports the second cylindrical portion 42b in the radial direction of the rotating shaft 40. The second holding member 61b is disposed outside the second fluid bearing 10b in the radial direction of the second fluid bearing 10b. The second fluid bearing 10b is attached to the second holding member 61b. The second lubricating liquid casing 90b is disposed adjacent to the second holding member 61b and forms a second storing space 91b that is capable of storing the lubricating liquid, which is to be supplied to the second fluid bearing 10b. The second supplying passage 50b is a passage through which the lubricating liquid is supplied to the second storing space 91b. The second squeeze film damper 15b is a space located between the second fluid bearing 10b and the second holding member 61b in the radial direction of the second fluid bearing 10b. The second squeeze film damper 15b communicates with the second supplying passage 50b.

The second impeller 30b has a front portion 31b facing forward from the second impeller 30b. The front portion 31b faces in a direction opposite to the direction in which the front portion 31a faces. That is, the forward direction for the second impeller 30b is opposite to the forward direction for the first impeller 30a. For example, the second taper portion 41b decreases in diameter toward the second end of the rotating shaft 40, which is in front of the second impeller 30b. In other words, the second taper portion 41b increases in diameter toward the second impeller 30b. The rotating shaft 40 includes the second cylindrical portion 42b, which is located closer than the second taper portion 41b to the second impeller 30b. For example, in the rotating shaft 40, the outer surface of the second taper portion 41b and the outer surface of the second cylindrical portion 42b are continuously formed. The second impeller 30b is fixed, for example, to the second cylindrical portion 42b.

The second fluid bearing 10b is a friction bearing. That is, a lubricating liquid is present between the second fluid bearing 10b and the second taper portion 41b and between the second fluid bearing 10b and the second cylindrical portion 42b. The second fluid bearing 10b is disposed, for example, in front of the second impeller 30b. The second fluid bearing 10b has a bearing hole that is formed by a taper bearing surface 11b for supporting the second taper portion 41b and a bearing hole that is formed by a straight bearing surface 12b for supporting the second cylindrical portion 42b. The taper bearing surface 11b is a truncated conical surface that is inclined with respect to the axis of the bearing hole formed by the taper bearing surface 11b. The taper bearing surface 11b forms a tapered hole that is slightly greater in diameter than the second taper portion 41b. The diameter of the tapered hole formed by the taper bearing surface 11b increases toward the second impeller 30b. Thus, a thrust load in the rightward direction in FIG. 3 is supported. The straight bearing surface 12b is a cylindrical surface that extends parallel to the axis of the bearing hole formed by the straight bearing surface 12b. In this way, the second fluid bearing 10b rotatably supports the second taper portion 41b and the second cylindrical portion 42b. For example, the second fluid bearing 10b supports a portion of the rotating shaft 40 near the second end of the rotating shaft 40 in front of the second impeller 30b.

For example, the second fluid bearing 10b has a flange, and the second holding member 61b has a radial surface that is in contact with the flange of the second fluid bearing 10b. The flange of the second fluid bearing 10b has through-holes (not shown) into which bolt are inserted. The radial surface of the second holding member 61b has grooves (not shown), into which ends of the bolts are inserted, at positions corresponding to the through-holes formed in the flange of the second fluid bearing 10b. The second fluid bearing 10b is attached to the second holding member 61b by inserting the bolts into the through-holes formed in the flange of the second fluid bearing 10b and into the grooves formed in the radial surface of the second holding member 61b.

The turbo machine 100a is, for example, a centrifugal turbo compressor. As illustrated in FIG. 1, for example, the turbo machine 100a further includes a motor 60, a first casing 71a, a second casing 71b, a motor casing 80, and a connection passage 75. The motor 60 is attached to a portion of the rotating shaft 40 between the first impeller 30a and the second impeller 30b in the axial direction of the rotating shaft 40. To be specific, a rotor of the motor 60 is attached to the rotating shaft 40. The motor casing 80 is a cylindrical casing, and the motor 60 is accommodated in the motor casing 80. For example, a stator of the motor 60 is attached to the inner surface of the motor casing 80. The first casing 71a has an inner surface 73a that is formed so as to surround the front portion 31a of the first impeller 30a from outside in the radial direction of the first impeller 30a. The second casing 71b has an inner surface 73b that is formed so as to surround the front portion 31b of the second impeller 30b from outside in the radial direction of the second impeller 30b. A discharge channel 72a is formed in the first casing 71a outside the first impeller 30a in the radial direction. A discharge channel 72b is formed in the second casing 71b outside the second impeller 30b in the radial direction. The discharge channel 72a of the first casing 71a communicates with a space in front of the second impeller 30b through the connection passage 75.

The motor 60 rotates the rotating shaft 40, the first impeller 30a, and the second impeller 30b at a high speed. The working fluid in a space in front of the first impeller 30a passes through the first impeller 30a and is compressed. The working fluid, which has been compressed while passing through the first impeller 30a, flows through the discharge channel 72a and the connection passage 75 to the space in front of the second impeller 30b. The working fluid in front of the second impeller 30b passes through the second impeller 30b and is further compressed. The working fluid, which has been compressed while passing through the second impeller 30b, flows through the discharge channel 72b and is discharged to the outside of the turbo machine 100a. Thus, the working fluid is compressed twice by the first impeller 30a and the second impeller 30b. Therefore, the turbo machine 100a has high compression efficiency and can have a high compression ratio.

In the turbo machine 100a, the motor 60, the first impeller 30a, and the second impeller 30b, which are attached to the rotating shaft 40, generate heat. Therefore, the temperature of the rotating shaft 40 tends to increase when the first impeller 30a and the second impeller 30b rotate. Therefore, the temperature difference between the rotating shaft 40 and the first fluid bearing 10a or between the rotating shaft 40 and the second fluid bearing 10b tends to increase, and the thermal expansion difference between the rotating shaft 40 and the first fluid bearing 10a or between the rotating shaft 40 and the second fluid bearing 10b tends to increase. Even in such a case, the rotating shaft 40 is stably supported, because the first fluid bearing 10a and the second fluid bearing 10b support the rotating shaft 40 in the radial direction.

When the turbo machine 100a is in a normal operation, the direction of a thrust load of a rotational body, including the rotating shaft 40, is limited to one direction. However, when the turbo machine 100a is in a transitional operation, the direction of a thrust load of the rotational body may not be limited to one direction. Even in such a case, with the turbo machine 100a, at least one of the taper bearing surface 11a of the first fluid bearing 10a and the taper bearing surface 11b of the second fluid bearing 10b can bear the thrust load of the rotational body.

The first holding member 61a is accommodated in the first casing 71a in front of the first impeller 30a. The second holding member 61b is accommodated in the second casing 71b in front of the second impeller 30b. As illustrated in FIG. 2, the first casing 71a has a passage 70a extending from the outer surface of the first casing 71a toward the first holding member 61a. The first holding member 61a has a passage 65a extending from the outer surface of the first holding member 61a to the first squeeze film damper 15a. The passage 70a and the passage 65a form a continuous passage. The passage 70a and the passage 65a constitute the first supplying passage 50a. As illustrated in FIG. 3, the second casing 71b has a passage 70b extending from the outer surface of the second casing 71b toward the second holding member 61b. The second holding member 61b has a passage 65b extending from the outer surface of the second holding member 61b to the second squeeze film damper 15b. The passage 70b and the passage 65b form a continuous passage. The passage 70b and the passage 65b constitute the second supplying passage 50b.

Figure 4:
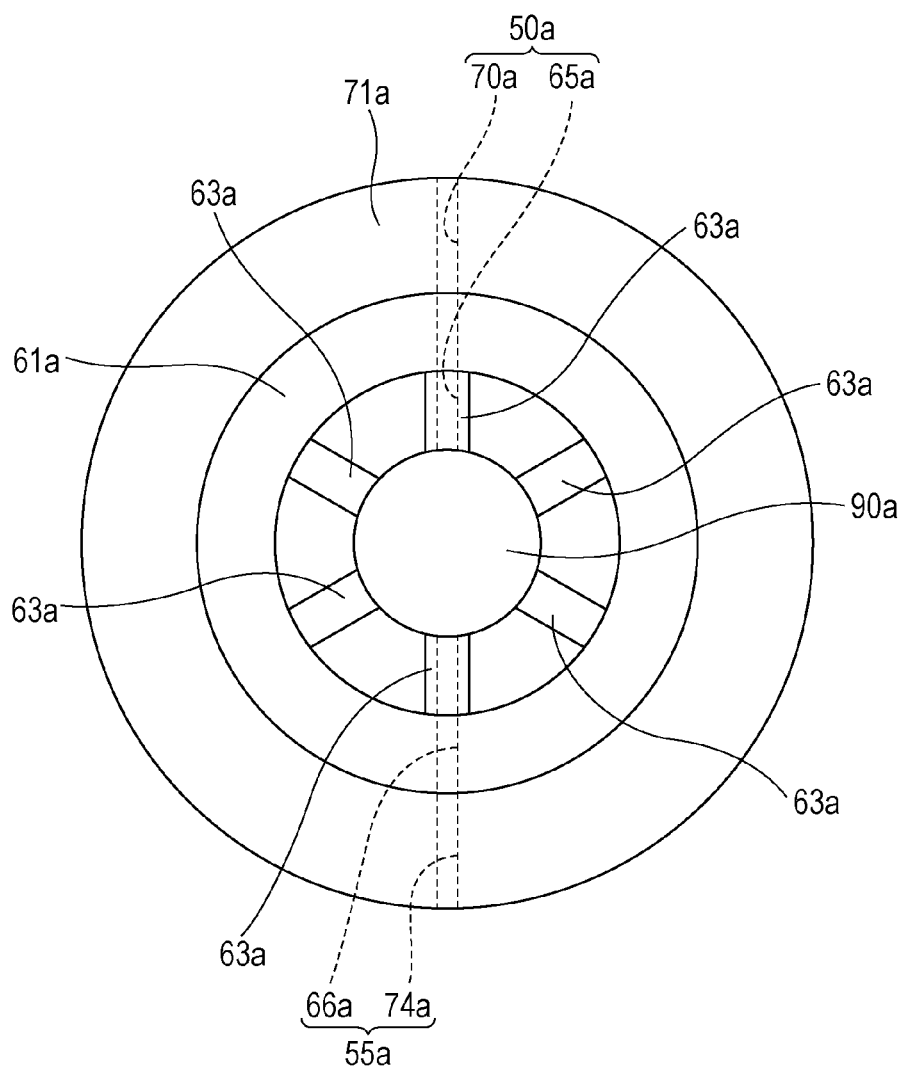
FIG. 4 is a projection view of the turbo machine seen in the direction of an arrow A in FIG. 2.

As illustrated in FIG. 4, the first holding member 61a includes a plurality of support portions 63a, each of which has a columnar shape. The support portions 63a are disposed so as to be separated from each other in the circumferential direction. A passage of the working fluid is formed by spaces between adjacent support portions 63a. A part of the passage 65a is formed in at least one of the support portions 63a. For example, as with the first holding member 61a, the second holding member 61b includes a plurality of support portions 63b, each of which has a columnar shape and which are disposed so as to be separated from each other in the circumferential direction. A passage of the working fluid is formed by spaces between adjacent support portions 63b. A part of the passage 65b is formed in at least one of the support portions 63b.

The first lubricating liquid casing 90a is disposed on a side of the first end of the rotating shaft 40 opposite from the second end. The second lubricating liquid casing 90b is disposed on a side of the second end of the rotating shaft 40 opposite from the first end.

As illustrated in FIG. 2, the rotating shaft 40 has a first lubricating liquid supply hole 43a, a first back supply hole 45a, and a first front supply hole 47a, which are formed, for example, in a portion of the rotating shaft 40 near the first end. The first lubricating liquid supply hole 43a extends from the first end of the rotating shaft 40 in the axial direction of the rotating shaft 40. The first back supply hole 45a is a hole that extends from the first lubricating liquid supply hole 43a in the radial direction of the rotating shaft 40 and opens to a space between the first cylindrical portion 42a and the first fluid bearing 10a. The first front supply hole 47a is a hole that extends from the first lubricating liquid supply hole 43a in the radial direction and opens to a space between the first taper portion 41a and the first fluid bearing 10a.

A lubricating liquid, for lubrication between the first fluid bearing 10a and the rotating shaft 40, is supplied to the first lubricating liquid supply hole 43a. Due to a centrifugal pump effect of the rotation of the rotating shaft 40, the lubricating liquid, which has been supplied to the first lubricating liquid supply hole 43a, passes through the first back supply hole 45a or the first front supply hole 47a and is supplied to a lubricating-liquid-film portion Fa between the first fluid bearing 10a and the rotating shaft 40. Thus, a sufficient amount of lubricating liquid can be supplied to the lubricating-liquid-film portion Fa between the first fluid bearing 10a and the rotating shaft 40. Moreover, the rotating shaft 40 can be sufficiently cooled by the lubricating liquid. One of the first back supply hole 45a and the first front supply hole 47a may be omitted. Even in this case, the same effect can be obtained by appropriately designing the shape, the size, or the like of the first lubricating liquid supply hole 43a and the shape, the size, or the like of the first back supply hole 45a or the first front supply hole 47a.

The diameter of the first back supply hole 45a or the diameter of the first front supply hole 47a is, for example, smaller than the diameter of the first lubricating liquid supply hole 43a. In this case, it is possible to prevent excessive supply of the lubricating liquid to the lubricating-liquid-film portion Fa between the first fluid bearing 10a and the rotating shaft 40. Moreover, it is possible to suppress a decrease in the pressure of the lubricating liquid in the first lubricating liquid supply hole 43a due to excessive supply of the lubricating liquid, and it is possible to prevent occurrence of cavitation in the first lubricating liquid supply hole 43a.

As illustrated in FIG. 3, the rotating shaft 40 has a second lubricating liquid supply hole 43b, a second back supply hole 45b, and a second front supply hole 47b, which are formed, for example, in a portion of the rotating shaft 40 near the second end. The second lubricating liquid supply hole 43b extends from the second end of the rotating shaft 40 in the axial direction of the rotating shaft 40. The second back supply hole 45b is a hole that extends from the second lubricating liquid supply hole 43b in the radial direction of the rotating shaft 40 and opens to a space between the second cylindrical portion 42b and the second fluid bearing 10b. The second front supply hole 47b is a hole that extends from the second lubricating liquid supply hole 43b in the radial direction and opens to a space between the second taper portion 41b and the second fluid bearing 10b.

A lubricating liquid, for lubrication between the second fluid bearing 10b and the rotating shaft 40, is supplied to the second lubricating liquid supply hole 43b. Due to a centrifugal pump effect of the rotation of the rotating shaft 40, the lubricating liquid, which has been supplied to the second lubricating liquid supply hole 43b, passes through the second back supply hole 45b or the second front supply hole 47b and is supplied to a lubricating-liquid-film portion Fb between the second fluid bearing 10b and the rotating shaft 40. Thus, a sufficient amount of lubricating liquid can be supplied to the lubricating-liquid-film portion Fb between the second fluid bearing 10b and the rotating shaft 40. Moreover, the rotating shaft 40 can be sufficiently cooled by the lubricating liquid. One of the second back supply hole 45b and the second front supply hole 47b may be omitted. Even in this case, the same effect can be obtained by appropriately designing the shape, the size, or the like of the second lubricating liquid supply hole 43b and the shape, the size, or the like of the second back supply hole 45b or the second front supply hole 47b.

The diameter of the second back supply hole 45b or the diameter of the second front supply hole 47b is, for example, smaller than the diameter of the second lubricating liquid supply hole 43b. In this case, it is possible to prevent excessive supply of the lubricating liquid to the lubricating-liquid-film portion Fb between the second fluid bearing 10b and the rotating shaft 40. Moreover, it is possible to suppress a decrease in the pressure of the lubricating liquid in the second lubricating liquid supply hole 43b due to excessive supply of the lubricating liquid, and it is possible to prevent occurrence of cavitation in the second lubricating liquid supply hole 43b.

As illustrated in FIG. 2, the first lubricating liquid casing 90a is disposed adjacent to the first holding member 61a, and the first storing space 91a is formed in the first lubricating liquid casing 90a. The first storing space 91a is a space that communicates with the inner space of the first lubricating liquid supply hole 43a and that is capable of storing the lubricating liquid, which is to be supplied to the first fluid bearing 10a. The amount of lubricating liquid supplied to the first fluid bearing 10a varies in accordance with the rotation speed of the rotating shaft 40. Because the first storing space 91a is capable of storing the lubricating liquid, variation in the supply amount of lubricating liquid can be suppressed and depletion of the lubricating liquid can be prevented. Preferably, the first end of the rotating shaft 40 is exposed to the first storing space 91a. In this case, the rotating shaft 40 is cooled by the lubricating liquid stored in the first storing space 91a. Preferably, the tip of the first taper portion 41a of the rotating shaft 40 is exposed to the first storing space 91a. In this case, the area of a portion of the rotating shaft 40 exposed to the first storing space 91a is small. Therefore, it is possible to reduce a loss that occurs as the rotating shaft 40 stirs the lubricating liquid stored in the first storing space 91a.

The lubricating liquid to be supplied to the first fluid bearing 10a is supplied to the first storing space 91a through the first supplying passage 50a. Because the first squeeze film damper 15a communicates with the first supplying passage 50a, at least a part of the lubricating liquid that flows through the first supplying passage 50a is supplied to the first squeeze film damper 15a. Thus, when the turbo machine 100a is in operation, the part of the lubricating liquid is contained in a small space that is formed between the first holding member 61a and the first fluid bearing 10a and that is the first squeeze film damper 15a; and the lubricating liquid forms a liquid film that can produce a squeeze effect. When the first fluid bearing 10a vibrates due to the rotation of the rotating shaft 40 or the like, the distance between the first fluid bearing 10a and the first holding member 61a in the radial direction changes, and a resistant force is generated due to the flow and compression of the lubricating liquid in the first squeeze film damper 15a. Thus, the lubricating liquid in the first squeeze film damper 15a produces a squeeze effect and reduces the vibration of the first fluid bearing 10a. In particular, the first squeeze film damper 15a can reduce vibration that occurs due to the high-speed rotation of the rotating shaft 40 or vibration that occurs due to resonance between the rotating shaft 40 and other components of the turbo machine 100a when the rotating shaft 40 is rotating at a specific speed. As a result, the turbo machine 100a has high reliability.

As illustrated in FIG. 2, for example, the turbo machine 100a further includes a first inlet passage 17a. The first squeeze film damper 15a communicates with the first storing space 91a through the first inlet passage 17a. The first inlet passage 17a is a passage through which the lubricating liquid flows from the first squeeze film damper 15a to the first storing space 91a. The lubricating liquid, which has been supplied to the first squeeze film damper 15a, flows to the first storing space 91a through the first inlet passage 17a. Thus, the lubricating liquid is prevented from becoming stagnant in the first squeeze film damper 15a, and an increase in the temperature of the lubricating liquid in the first squeeze film damper 15a is suppressed. As a result, foaming of the lubricating liquid in the first squeeze film damper 15a is prevented. If foaming of the lubricating liquid occurs in the first squeeze film damper 15a, it becomes difficult for the first squeeze film damper 15a to reduce the vibration of the first fluid bearing 10a. Because the turbo machine 100a includes the first inlet passage 17a, even in a case where the turbo machine 100a is operated for a long time and the temperature of a region around the first fluid bearing 10a increases, the vibration reduction effect of the first squeeze film damper 15a can be advantageously produced. Therefore, the turbo machine 100a has high reliability.

As illustrated in FIG. 3, the second lubricating liquid casing 90b is disposed adjacent to the second holding member 61b, and the second storing space 91b is formed in the second lubricating liquid casing 90b. The second storing space 91b is a space that communicates with the inner space of the second lubricating liquid supply hole 43b and that is capable of storing the lubricating liquid, which is to be supplied to the second fluid bearing 10b. The amount of lubricating liquid supplied to the second fluid bearing 10b varies in accordance with the rotation speed of the rotating shaft 40. Because the second storing space 91b is capable of storing the lubricating liquid, variation in the supply amount of lubricating liquid can be suppressed and depletion of the lubricating liquid can be prevented. Preferably, the second end of the rotating shaft 40 is exposed to the second storing space 91b. In this case, the rotating shaft 40 is cooled by the lubricating liquid stored in the second storing space 91b. Preferably, the tip of the second taper portion 41b of the rotating shaft 40 is exposed to the second storing space 91b. In this case, the area of a portion of the rotating shaft 40 exposed to the second storing space 91b is small. Therefore, it is possible to reduce a loss that occurs as the rotating shaft 40 stirs the lubricating liquid stored in the second storing space 91b.

The lubricating liquid to be supplied to the second fluid bearing 10b is supplied to the second storing space 91b through the second supplying passage 50b. Because the second squeeze film damper 15b communicates with the second supplying passage 50b, at least a part of the lubricating liquid that has passed through the second supplying passage 50b is supplied to the second squeeze film damper 15b. Thus, when the turbo machine 100a is in operation, the lubricating liquid is contained in a small space formed between the second holding member 61b, which is the second squeeze film damper 15b, and the second fluid bearing 10b; and the lubricating liquid forms a liquid film that can produce a squeeze effect. When the second fluid bearing 10b vibrates due to the rotation of the rotating shaft 40 or the like, the distance between the second fluid bearing 10b and the second holding member 61b in the radial direction changes, and a resistant force is generated due to flow and compression of the lubricating liquid in the second squeeze film damper 15b. Thus, the lubricating liquid in the second squeeze film damper 15b produces a squeeze effect and reduces the vibration of the second fluid bearing 10b.

As illustrated in FIG. 3, for example, the turbo machine 100a further includes a second inlet passage 17b. The second squeeze film damper 15b communicates with the second storing space 91b through the second inlet passage 17b. The second inlet passage 17b is a passage through which the lubricating liquid flows from the second squeeze film damper 15b to the second storing space 91b. The lubricating liquid, which has been supplied to the second squeeze film damper 15b, flows to the second storing space 91b through the second inlet passage 17b. Thus, the lubricating liquid is prevented from becoming stagnant in the second squeeze film damper 15b.

As illustrated in FIG. 2, for example, the turbo machine 100a further includes a first partitioning member 13a, a first discharge passage 55a, and a first sealing member 81a. The first partitioning member 13a is disposed on a side of the first holding member 61a opposite from the first lubricating liquid casing 90a. The first partitioning member 13a forms a first discharge space 19a that stores the lubricating liquid, which has flowed out of the first fluid bearing 10a. For example, the first partitioning member 13a is located closer than the first fluid bearing 10a to the first impeller 30a in the axial direction of the rotating shaft 40. The first discharge passage 55a is a passage through which the lubricating liquid stored in the first discharge space 19a is discharged to the outside of the first discharge space 19a. A passage 66a, which extends from the first discharge space 19a to the outer surface of the first holding member 61a, is formed in the first holding member 61a. A passage 74a, which extends from the inner surface of the first casing 71a to the outer surface of the first casing 71a, is formed in the first casing 71a. The passage 66a and the passage 74a form a continuous passage. The passage 66a and the passage 74a constitute the first discharge passage 55a. The first sealing member 81a is disposed between the first fluid bearing 10a and the first holding member 61a in the radial direction of the first fluid bearing 10a. The first sealing member 81a separates the first squeeze film damper 15a and the first discharge space 19a from each other.

A small space is formed between the first partitioning member 13a and the rotating shaft 40. Through the small space, the first discharge space 19a communicates with the space in front of the first impeller 30a, into which the working fluid is drawn. The pressure in the first discharge space 19a is substantially equal to the pressure of the working fluid drawn into the first impeller 30a. The first squeeze film damper 15a is separated from the first discharge space 19a by the first sealing member 81a. At least a part of the lubricating liquid to be supplied to the first storing space 91a is supplied to the first squeeze film damper 15a. Therefore, by supplying the lubricating liquid to the first storing space 91a with a comparatively high pressure, the pressure of the lubricating liquid in the first squeeze film damper 15a can be maintained comparatively high. For example, the pressure of the lubricating liquid in the first squeeze film damper 15a is maintained at a pressure that is sufficiently higher than the saturated vapor pressure of the lubricating liquid. Thus, the first sealing member 81a prevents foaming of a part of the lubricating liquid, which may occur if the pressure of the lubricating liquid contained in the first squeeze film damper 15a decreases due to the influence of the pressure in the first discharge space 19a. In particular, the first squeeze film damper 15a has high performance in reducing vibration in a case where the turbo machine 100a is operated for a long time and the temperature of the components of the turbo machine 100a increases. Moreover, the first squeeze film damper 15a has high performance in reducing vibration also in a case where the compression ratio of the turbo machine 100a is high and therefore the pressure in the first discharge space 19a tends to decrease and foaming of the lubricating liquid tends to occur around the first discharge space 19a due to a reduced pressure. As a result, the turbo machine 100a produces high vibration reduction effect.

As illustrated in FIG. 3, for example, the turbo machine 100a further includes a second partitioning member 13b, a second discharge passage 55b, and a second sealing member 81b. The second partitioning member 13b is disposed on a side of the second holding member 61b opposite from the second lubricating liquid casing 90b. The second partitioning member 13b forms a second discharge space 19b that stores the lubricating liquid, which has flowed out of the second fluid bearing 10b. For example, the second partitioning member 13b is located closer than the second fluid bearing 10b to the second impeller 30b in the axial direction of the rotating shaft 40. The second discharge passage 55b is a passage through which the lubricating liquid stored in the second discharge space 19b is discharged to the outside of the second discharge space 19b. A passage 66b, which extends from the second discharge space 19b to the outer surface of the second holding member 61b, is formed in the second holding member 61b. A passage 74b, which extends from the inner surface of the second casing 71b to the outer surface of the second casing 71b, is formed in the second casing 71b. The passage 66b and the passage 74b form a continuous passage. The passage 66b and the passage 74b constitute the second discharge passage 55b. The second sealing member 81b is disposed between the second fluid bearing 10b and the second holding member 61b in the radial direction of the second fluid bearing 10b. The second sealing member 81b separates the second squeeze film damper 15b and the second discharge space 19b from each other.

The working fluid of the turbo machine 100a, which is not particularly limited, is, for example, a fluid whose saturated vapor pressure is a negative pressure at a normal temperature (JIS: 20° C.±15° C./JIS Z 8703). Examples of such a fluid include a fluid that is composed mainly of water, alcohol, or ether. When the working fluid is a fluid whose saturated vapor pressure at a normal temperature is a negative pressure, the pressure of the working fluid discharged from the turbo machine 100a is a negative pressure. Accordingly, a thrust load generated when the first impeller 30a and the second impeller 30b are rotating at a high speed is very small, and a load to be supported by the first fluid bearing 10a is small. Therefore, the size of the first fluid bearing 10a can be reduced. As a result, the production cost of the turbo machine 100a can be reduced.

In the turbo machine 100a, preferably, the first fluid bearing 10a and the second fluid bearing 10b have the same size, and the first fluid bearing 10a and the second fluid bearing 10b are made of materials of the same type. In this case, the first fluid bearing 10a and the second fluid bearing 10b expand to about the same degree when temperature changes. Therefore, a load with which the first fluid bearing 10a supports the rotating shaft 40 and a load with which the second fluid bearing 10b supports the rotating shaft 40 are not likely to deviate from each other, and the rotating shaft 40 can be stably supported. Moreover, the commonality of components of the first fluid bearing 10a and components of the second fluid bearing 10b can be increased, and therefore the production cost of the turbo machine 100a can be reduced.

The lubricating liquid, which is used for lubrication between the first fluid bearing 10a and the rotating shaft 40 and between the second fluid bearing 10b and the rotating shaft 40, is not particularly limited. For example, the lubricating liquid is a fluid of the same type as the working fluid of the turbo machine 100a. In this case, the running cost of the turbo machine 100a can reduced, compared with a case where a fluid of a type different from the working fluid is used as the lubricating liquid. Moreover, contamination of the working fluid with the lubricating liquid can be prevented.

For example, in the case where the working fluid of the turbo machine 100a is a fluid whose saturated vapor pressure at a normal temperature is a negative pressure, a part of the working fluid that is in a liquid state outside the turbo machine 100a is supplied, as the lubricating liquid, to the first fluid bearing 10a through the first supplying passage 50a. A part of the working fluid that is in a liquid state outside the turbo machine 100a may be supplied, as the lubricating liquid, to the first fluid bearing 10a through the first supplying passage 50a and may be supplied, as the lubricating liquid, to the second fluid bearing 10b through the second supplying passage 50b.

Modification

The turbo machine 100a may be modified in various ways. According to the circumstances, the rotating shaft 40 need not include the second taper portion 41b and the second cylindrical portion 42b; and the turbo machine 100a need not include the second impeller 30b, the second fluid bearing 10b, the second holding member 61b, the second lubricating liquid casing 90b, the second supplying passage 50b, and the second squeeze film damper 15b. The front portion 31b of the second impeller 30b may face in the same direction as the front portion 31a of the first impeller 30a. The turbo machine 100a may be a fluid machine in which a working fluid is expanded while passing through the first impeller 30a and the kinetic energy of the working fluid is converted to the rotational power of the rotating shaft 40. In this case, preferably, a generator is attached to the rotating shaft 40. By doing so, the rotational power can be converted to electric energy.

A portion of the first fluid bearing 10a for supporting the first taper portion 41a and a portion of the first fluid bearing 10a for supporting the first cylindrical portion 42a may be different members. In this case, it is not necessary to form the taper bearing surface 11a and the straight bearing surface 12a by machining a single workpiece, so that restrictions on the shape of a machining tool can be reduced. Thus, the first fluid bearing 10a can be manufactured easily. Moreover, the flexibility in the design of the first fluid bearing 10a can be increased. In this case, the portion of the first fluid bearing 10a for supporting the first taper portion 41a and the portion of the first fluid bearing 10a for supporting the first cylindrical portion 42a may be connected to each other by using a screw or may be disposed so as to be separated from each other in the axial direction of the rotating shaft 40.

Figure 5:
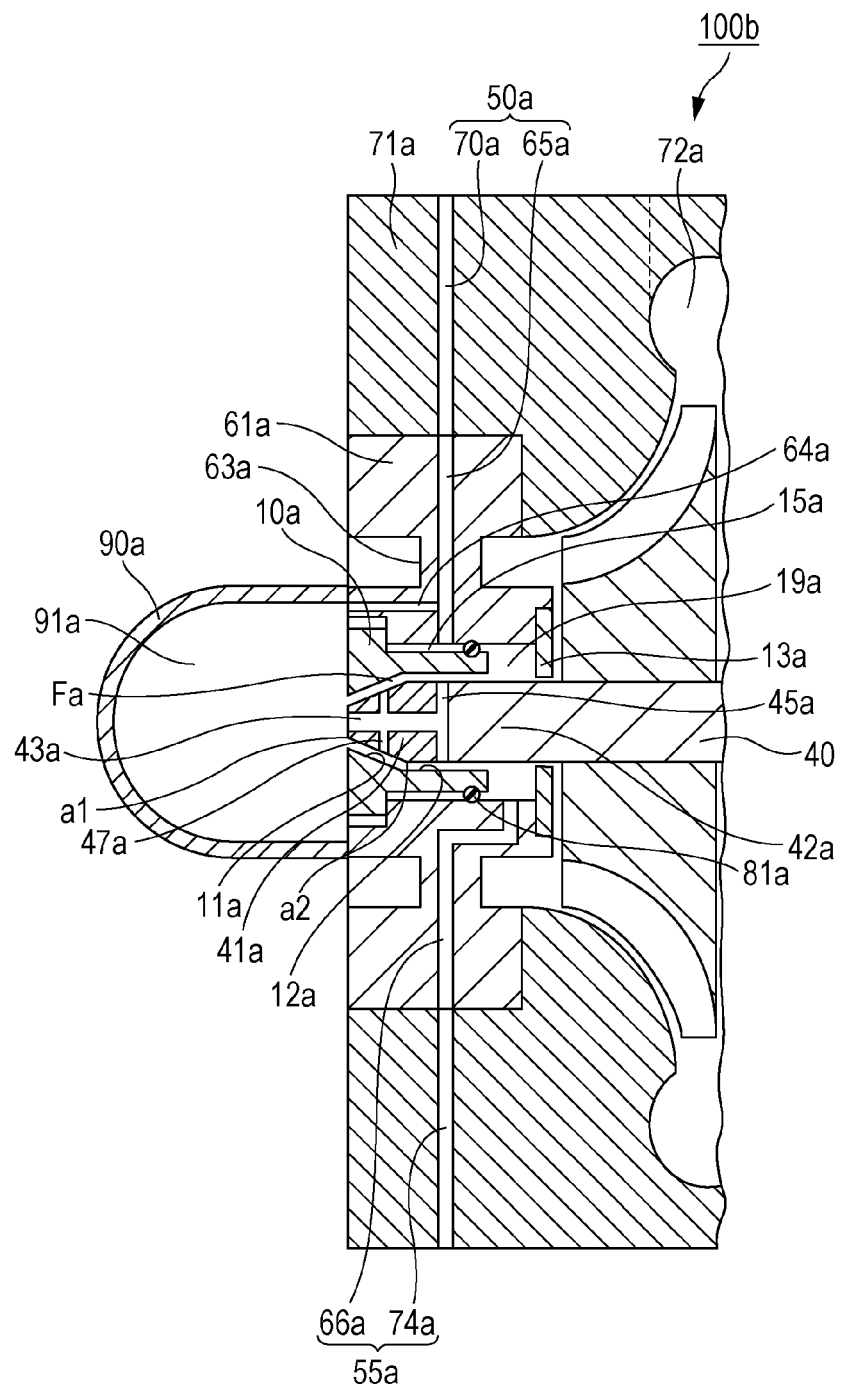
FIG. 5 is an enlarged sectional view illustrating a part of a turbo machine according to a modification.

The turbo machine 100a may be modified into a turbo machine 100b illustrated in FIG. 5. Unless otherwise noted, the turbo machine 100b has the same structure as the turbo machine 100a. In the turbo machine 100b, a passage 64a, which extends from a part of the passage 65a to the first storing space 91a, is formed in the first holding member 61a. Thus, a part of the lubricating liquid to be supplied to the first storing space 91a is supplied to the first storing space 91a without flowing through the first squeeze film damper 15a. Moreover, in the turbo machine 100b, the first inlet passage 17a is not formed in the first fluid bearing 10a. In this case, the lubricating liquid that flows through the passage 64a can indirectly cool the lubricating liquid contained in the first squeeze film damper 15a.

Second Embodiment

Next, a turbo machine 100c according to a second embodiment will be described. Unless otherwise noted, the turbo machine 100c has the same structure as the turbo machine 100a. Elements of the turbo machine 100c that are the same as or correspond to those of the turbo machine 100a will be denoted by the same numerals, and detailed descriptions of such elements will be omitted. Descriptions of the first embodiment are applicable to the second embodiment unless they are technologically contradictory.

Figure 6:
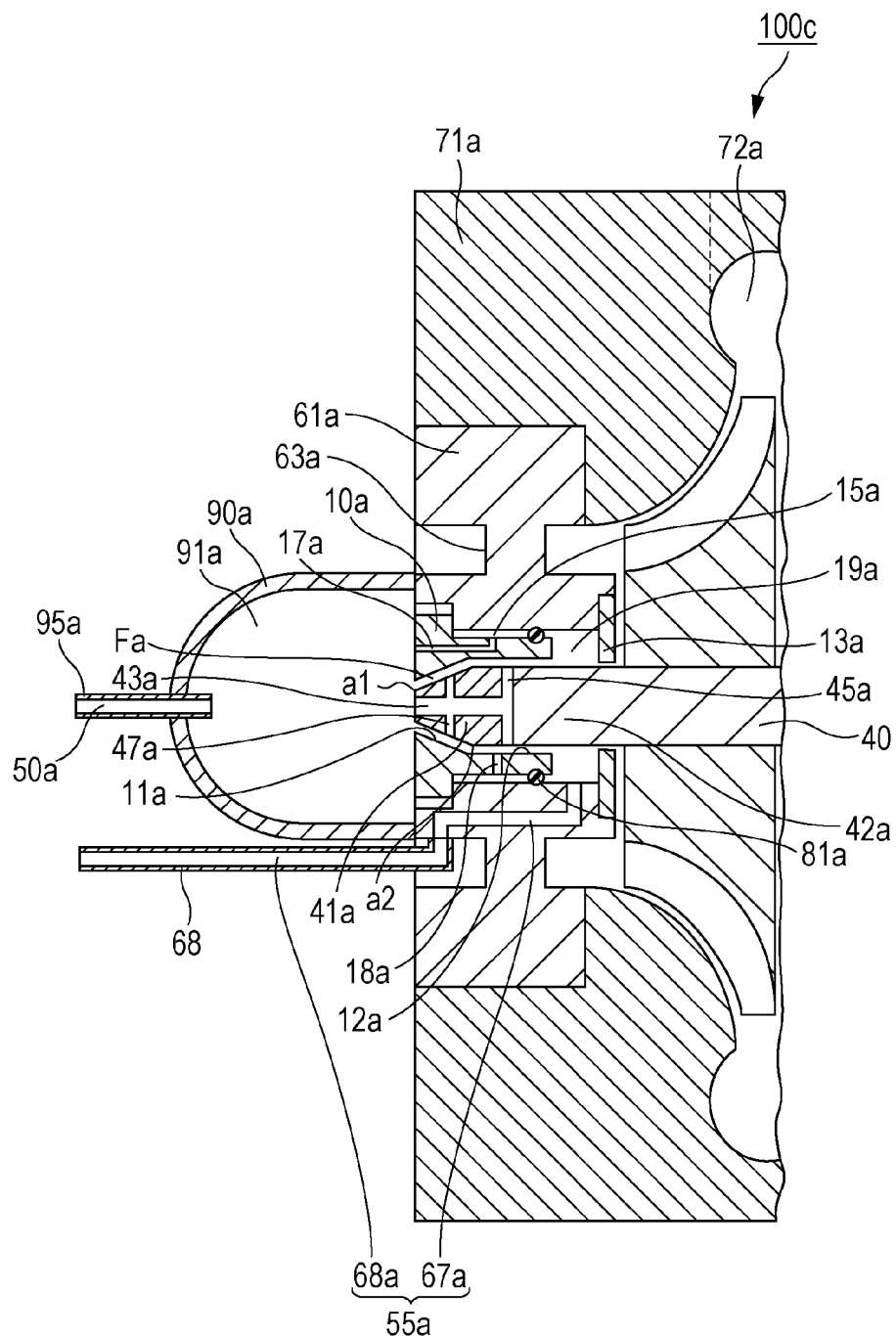
FIG. 6 is an enlarged sectional view illustrating a part of a turbo machine according to a second embodiment.
Figure 7:
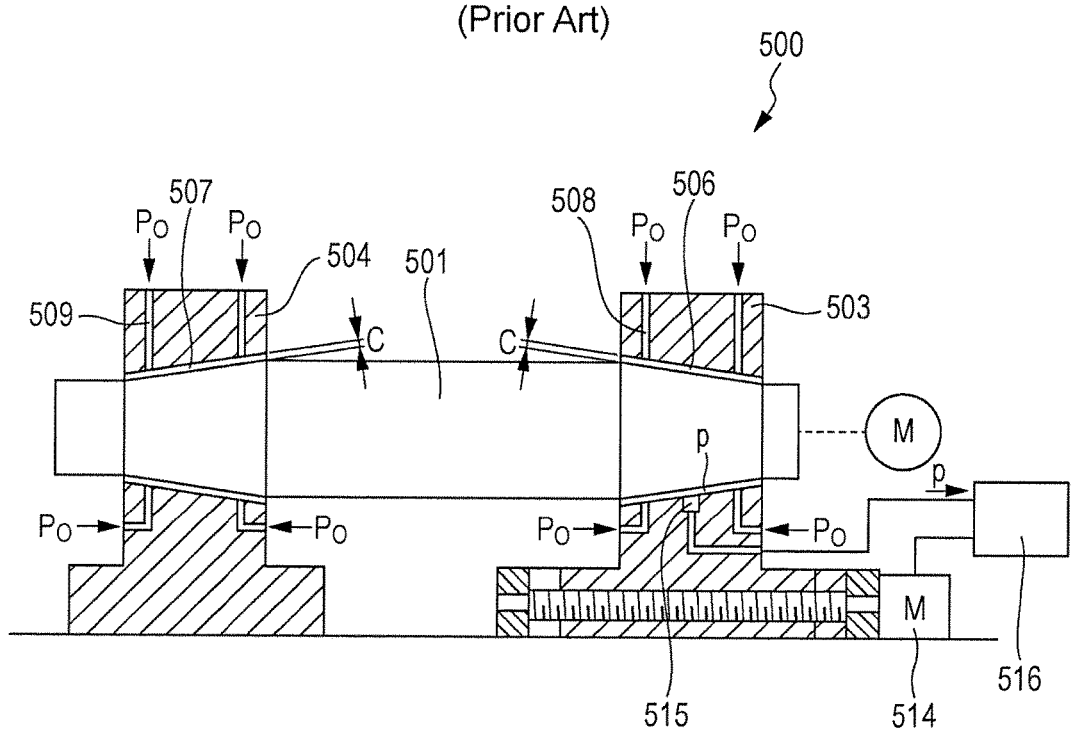
FIG. 7 is a sectional view illustrating a existing air bearing device.
Figure 8:
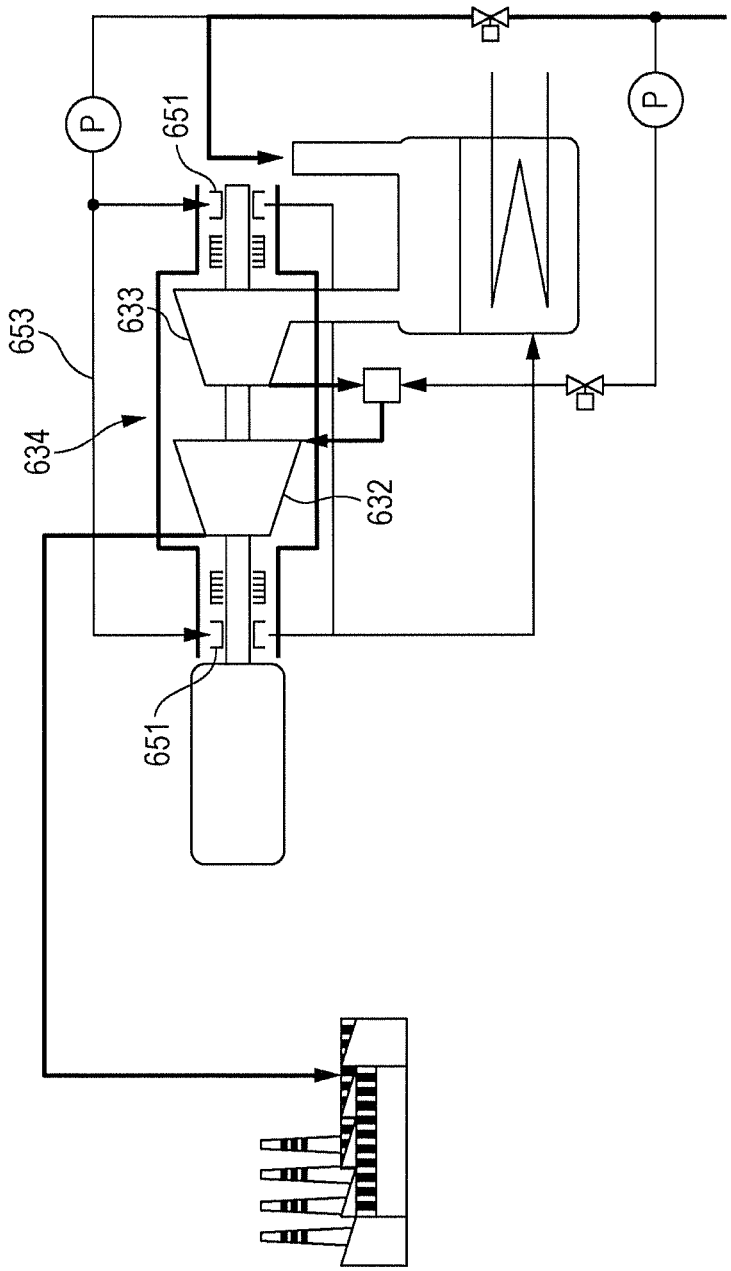
FIG. 8 illustrates the structure of an existing heat pump system.

As illustrated in FIG. 6, the turbo machine 100c includes a supply pipe 95a. The supply pipe 95a is attached to the first lubricating liquid casing 90a, and one end of the supply pipe 95a is open to the first storing space 91a. The supply pipe 95a forms the first supplying passage 50a. Therefore, the turbo machine 100c does not have the passage 65a in the first holding member 61a. A communication passage 18a, which extends in the radial direction of the first fluid bearing 10a, is formed in the first fluid bearing 10a. The lubricating-liquid-film portion Fa and the first squeeze film damper 15a communicate with each other through the communication passage 18a. Therefore, the first squeeze film damper 15a communicates with the first supplying passage 50a through the first storing space 91a, the first lubricating liquid supply hole 43a, the first back supply hole 45a or the first front supply hole 47a, the lubricating-liquid-film portion Fa, and the communication passage 18a.

In the turbo machine 100c, due to a centrifugal pump effect of the rotation of the rotating shaft 40, the pressure of the lubricating liquid supplied to the lubricating-liquid-film portion Fa from the first back supply hole 45a or the first front supply hole 47a is higher than the pressure of the lubricating liquid stored in the first storing space 91a. Therefore, the lubricating liquid flows from the lubricating-liquid-film portion Fa to the first squeeze film damper 15a through the communication passage 18a. Subsequently, the lubricating liquid is returned to the first storing space 91a through the first inlet passage 17a. Thus, the lubricating liquid is prevented from becoming stagnant in the first squeeze film damper 15a, and an increase in the temperature of the lubricating liquid in the first squeeze film damper 15a is suppressed. As a result, foaming of the lubricating liquid in the first squeeze film damper 15a is prevented. In particular, in a case where the turbo machine 100c is operated for a long time and the temperature of a region around the first fluid bearing 10a increases due to heat generated by the motor 60 or due to frictional heat generated when the first impeller 30a compresses the working fluid, the vibration reduction effect of the first squeeze film damper 15a is advantageously produced, and the turbo machine 100c has high reliability.

The turbo machine 100c includes a discharge pipe 68. The discharge pipe 68 forms a passage 68a. One end of the discharge pipe 68 is connected to an inner peripheral portion of the first holding member 61a, which is located inside the support portion 63a in the radial direction of the first holding member 61a. A passage 67a, which extends from the first discharge space 19a to the passage 68a, is formed in the inner peripheral portion of the first holding member 61a. The passage 67a and the passage 68a form a continuous passage. The passage 67a and the passage 68a constitute the first discharge passage 55a.

With the turbo machine 100c, a part of the first supplying passage 50a and a part of the first discharge passage 55a are not formed in the support portion 63a of the first holding member 61a. Therefore, compared with the turbo machine 100a, it is easy to increase the strength (rigidity) of the support portion 63a.

The turbo machine according to the present disclosure is particularly useful as a compressor of a refrigeration cycle device that is used in turbo freezers or commercial air conditioners.

What is claimed is:

1. A turbo machine comprising:
   a rotating shaft that includes a first taper portion and a first cylindrical portion, the first taper portion decreasing in diameter toward a first end of the rotating shaft in an axial direction of the rotating shaft, the first cylindrical portion being located on a side of the first taper portion opposite from the first end, the first cylindrical portion being constant in diameter;
   a first impeller that is located on the side of the first taper portion opposite from the first end in the axial direction of the rotating shaft, that is fixed to the rotating shaft, and that compresses or expands a working fluid;
   a first fluid bearing that rotatably supports the first taper portion both in a radial direction and the axial direction of the rotating shaft via a lubricating liquid and that rotatably supports the first cylindrical portion in the radial direction of the rotating shaft via the lubricating liquid;

a first holder that is disposed outside the first fluid bearing in a radial direction of the first fluid bearing, the first fluid bearing being attached to the first holder;

a first lubricating liquid casing that is disposed adjacent to the first holder and that forms a first storing space, the first storing space being capable of storing the lubricating liquid, which is to be supplied to the first fluid bearing;

a first supplying passage through which the lubricating liquid is supplied to the first storing space; and a first squeeze film damper that is a space located between the first fluid bearing and the first holder in the radial direction of the first fluid bearing, the first squeeze film damper communicating with the first supplying passage.

2. The turbo machine according to claim 1, further comprising:

a first inlet passage through which the first squeeze film damper communicates with the first storing space and through which the lubricating liquid flows from the first squeeze film damper to the first storing space.

3. The turbo machine according to claim 1, further comprising:

a first partition that is disposed on a side of the first holder opposite from the first lubricating liquid casing, the first partition forming a first discharge space that stores the lubricating liquid, which has flowed out of the first fluid bearing;

a first discharge passage through which the lubricating liquid stored in the first discharge space is discharged to the outside of the first discharge space; and a first seal that is disposed between the first fluid bearing and the first holder in the radial direction of the first fluid bearing and that separates the first squeeze film damper and the first discharge space from each other.

4. The turbo machine according to claim 1, wherein the rotating shaft further includes a second taper portion and a second cylindrical portion, the second taper portion decreasing in diameter toward a second end of the rotating shaft in the axial direction of the rotating shaft, the second cylindrical portion being located on a side of the second taper portion opposite from the second end, the second cylindrical portion being constant in diameter, the turbo machine further comprising:

a second impeller that is located on a side of the first impeller opposite from the first fluid bearing in the axial direction of the rotating shaft, that is fixed to the rotating shaft, and that further compresses or expands the working fluid that has been compressed or expanded by the first impeller;

a second fluid bearing that is disposed on a side of the second impeller opposite from the first impeller in the axial direction of the rotating shaft, that rotatably supports the second taper portion both in the radial direction and the axial direction of the rotating shaft via a lubricating liquid, and that rotatably supports the second cylindrical portion in the radial direction of the rotating shaft via the lubricating liquid;

a second holder that is disposed outside the second fluid bearing in a radial direction of the second fluid bearing, the second fluid bearing being attached to the second holder;

a second lubricating liquid casing that is disposed adjacent to the second holder and that forms a second storing space, the second storing space being capable of storing the lubricating liquid, which is to be supplied to the second fluid bearing;

a second supplying passage through which the lubricating liquid is supplied to the second storing space; and a second squeeze film damper that is a space located between the second fluid bearing and the second holder in the radial direction of the second fluid bearing, the second squeeze film damper communicating with the second supplying passage.

5. The turbo machine according to claim 1, wherein:

the turbo machine comprises the working fluid, and the working fluid is a fluid whose saturated vapor pressure at a normal temperature is a negative pressure, and a part of the working fluid that is in a liquid state outside of the turbo machine is supplied, as the lubricating liquid, to the first fluid bearing through the first supplying passage.

6. The turbo machine according to claim 4, wherein:

the turbo machine comprises the working fluid, and the working fluid is a fluid whose saturated vapor pressure at a normal temperature is a negative pressure, and a part of the working fluid that is in a liquid state outside of the turbo machine is supplied, as the lubricating liquid, to the first fluid bearing through the first supplying passage and is supplied, as the lubricating liquid, to the second fluid bearing through the second supplying passage.

* * * * *